United States Patent
Holovacs et al.

(10) Patent No.: US 8,136,042 B2
(45) Date of Patent: Mar. 13, 2012

(54) LOCAL PORT BROWSER INTERFACE

(75) Inventors: Jayson T. Holovacs, Dunellen, NJ (US); Swen Anderson, Saxony (DE); Scott Coleman, Fairfax, VA (US); Christian Paetz, Zwickau (DE)

(73) Assignee: Raritan Americas, Inc., Somerset, NJ (US)

( * ) Notice: Subject to any disclaimer, the term of this patent is extended or adjusted under 35 U.S.C. 154(b) by 761 days.

(21) Appl. No.: 12/118,046

(22) Filed: May 9, 2008

(65) Prior Publication Data

US 2008/0282003 A1 Nov. 13, 2008

Related U.S. Application Data (60) Provisional application No. 60/917,349, filed on May 11, 2007.

(51) Int. Cl.
*G06F 3/00* (2006.01)
*G06F 15/16* (2006.01)

(52) U.S. Cl. ........ 715/740; 715/771; 709/223; 709/250; 370/392; 370/401

(58) Field of Classification Search .................. 715/740, 715/736, 738; 709/223, 250; 370/392, 400
See application file for complete search history.

(56) References Cited

U.S. PATENT DOCUMENTS

| | | | |
|---|---|---|---|
| 5,721,842 A | 2/1998 | Beasley | |
| 5,732,212 A | 3/1998 | Perholtz | |
| 5,884,096 A | 3/1999 | Beasley | |
| 5,937,176 A | 8/1999 | Beasley | |
| 6,112,264 A | 8/2000 | Beasley | |
| 6,345,323 B1 | 2/2002 | Beasley | |
| 6,378,009 B1 | 4/2002 | Pinkston, II | |
| 6,510,350 B1 | 1/2003 | Steen, III et al. | |
| 6,771,213 B2 | 8/2004 | Durst | |
| 7,478,182 B2* | 1/2009 | Schweig | 710/73 |
| 7,684,483 B2* | 3/2010 | Coleman | 375/240.01 |
| 7,853,663 B2* | 12/2010 | Hoerl et al. | 709/208 |
| 7,853,740 B2* | 12/2010 | Liaw et al. | 710/62 |
| 2002/0154753 A1 | 10/2002 | Schofield | |
| 2004/0042547 A1 | 3/2004 | Coleman | |
| 2004/0141595 A1 | 7/2004 | Crockett | |
| 2005/0076102 A1* | 4/2005 | Chen et al. | 709/220 |
| 2005/0198245 A1* | 9/2005 | Burgess et al. | 709/223 |
| 2006/0107061 A1 | 5/2006 | Holovacs | |
| 2006/0173996 A1* | 8/2006 | Bates et al. | 709/224 |
| 2006/0202964 A1* | 9/2006 | Liaw et al. | 345/168 |
| 2007/0033289 A1* | 2/2007 | Nuyttens et al. | 709/230 |
| 2007/0124474 A1* | 5/2007 | Margulis | 709/226 |
| 2007/0180160 A1* | 8/2007 | Schweig | 710/15 |
| 2008/0005414 A1* | 1/2008 | Liu et al. | 710/62 |
| 2009/0013056 A1* | 1/2009 | Weinstock et al. | 709/208 |

OTHER PUBLICATIONS

The extended European Search Report by the European Patent Office, issued on Jul. 16, 2010, in the European application No. 08755222.0.

(Continued)

*Primary Examiner* — Tadeese Hailu (74) *Attorney, Agent, or Firm* — Novak Druce DeLuca + Quigg LLP (57) ABSTRACT

The present invention relates to KVM switches that contain both remote and local ports and provide a user of the local port with a similar WEB based interface experience as that experienced by the remote user.

9 Claims, 6 Drawing Sheets

OTHER PUBLICATIONS

Avocent: "DSR Switch Installer/User Guide," innet Mar. 20, 2007, XP 002577499, Retriveved from the Internet: URL: ftp://ftp.avocent.com/public/product-upgrades/$DS1800/DSR%20Mega%20Manual/590686616A.pdf.
Lewin A. R. W. Edwards: "Open-Source Robotics and Process Control Cookbook," 2005, Newnes, USA, XP 002577376, ISBN: 0750677783.
Robert Lesieur et al., "Avocent Digital Access KVM Module," inet, Dell Power Solutiions, Nov. 2005, pp. 95-97, XP002577375, Retrieved from the Internet: http://www.dell.com/downloads/global/power/ps4q05-20050182-Avocent.pdf.
The International Search Report and Written Opinion by the International Searching Authority, issued on Aug. 29, 2008, in the PCT application No. PCT/US08/63219.
Adder, Products Brochure, APX 304572-304579, Apr. 1, 1998, 8 pages.
AdderViewOSD, Products Brochure, RCI 173246-173279, Aug. 1, 2002.
Avocent's Pre-Markman Hearing Memorandum in Support of its Proposed Claim Constructions (Dec. 15, 2004).
Avocent Redmond's Answering Pre-Markman Hearing Briefing (Jan. 18, 2005).
Avocent Redmond's Supplemental Responses to Raritan's Second Set of Post-Remand Interrogatories (Nos. 15R-17R), Mar. 14, 2005.
Apex, OutLook User Guide, 1997.
Apex et al., Products Brochure, APX 082949-082971, 1996.
Apex PC Solutions, Users Guide, 1993.
Apex, Products Brochure, APX 018983-018996, Jan. 7, 1997.
Apex, Products Brochure, APX 019103-019121, 1995-1996.
Apex, Products Brochure, APX 056304-056346, Oct. 1, 1998.
Apex et al, Products Brochure, APX 316564-316621.
Apex et al, Products Brochure, APX 316848-316909.
Apex et al, Products Brochure, APX 316910-316969.
Apex's Sales Brochure, Sep. 1, 1998, 1 page.
Apex, SwitchBack User Guide, 1995.
Apex's Motion on the PolyCon Catalog and Supporting Memorandum, Jan. 15, 2002.
Apex's Proposed Markman Findings, Jan. 25, 2002.
Appendix1 to Apex's Proposed Markman Findings, Jan. 25, 2002.
Badman, Switching into High Gear, Network Computing, Apr. 30, 2001.
Belkin, The OmniView PRO User Manual, Jul. 16, 2001.
Bruce McNair Deposition Transcript, Case No. 01-CV-4435, May 5, 2005.
Compaq, White papers, 1996, APX 083313-APX 083326, APX 083335-APX 083389.
Ching-I Hsu Deposition Transcript, Case No. 01-CV-4435, Mar. 11, 2005.
Cybex, Director Installer/User Guide, Nov. 1996.
Cybex, 4 x P & 1 x P KVM Switches Guide to Applications, 1996.
Datavision, Product Brochure, 1992, 3 pages.
Declaration of Joseph C. McAlexander in Support of Apex's Motion for a Preliminary Injunction, Sep. 17, 2001.
Declaration of Joseph C. McAlexander, III in the Civil Action No. 01-CV-4435, Dec. 15, 2004.
Declaration of Sharad Malik, Ph. D., (Jan. 8, 2002).
Declaration of Sharad Malik, Ph.D. (Jan. 18, 2005).
Defendant Raritan Computer Inc.'s Claim Construction Statement (Dec. 15, 2004).
Defendant Raritan Computer Inc.'s Motion for Partial Summary Judgment (Jan. 8, 2002).
Defendant Raritan Computer Inc.'s Proposed Findings of Fact and Conclusions of Law, Apr. 27, 2005.
Defendant Raritan Computer Inc.'s Reply to Avocent's Proposed Claim Constructions (Jan. 18, 2005).
Defendant Raritan Computer, Inc.'s Response to Plaintiff's Second Set of Interrogatories (Nos. 9-12), Oct. 30, 2001.
Defendant Raritan Computer, Inc.'s Second Set of Interrogatories to Plaintiff Apex, Nov. 16, 2001.
Defendant Raritan Computer, Inc.'s Supplemental Response to Plaintiff's First Set of Interrogatories (Nos. 9-12), Aug. 31, 2001.
Defendant Raritan Computer, Inc.'s Supplemental Response to Plaintiff's Second Set of Interrogatories (Nos. 9-12), Dec. 12, 2001.
DEI, Central Control of Multiple PCs Without Massive Cabling, product brochure, Nov. 1992.
Expert Report by Joseph C. McAlexander Regarding Infringement and Validity of U.S. Patent Nos. 5,884,096, 5,937,176 and 6,112,264, Jan. 3, 2001.
Expert Report by Joseph C. McAlexander Regarding Infringement and Validity of U.S. Patent Nos. 5,884,096, 5,937,176 and 6,112,264, Jan. 3, 2001. Claim Charts.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
File History of Reissue U.S. Patent No. 5,732,212, Apr. 11, 2002. Part 1.
File History of Reissue U.S. Patent No. 5,732,212, Apr. 11, 2002. Part 2.
File History of U.S. Appl. No. 10/032,325, Jun. 14, 2004.
Findings and Conclusions, *Apex* v. *Raritan*, Civil Action No. 01-CV-0035, Feb. 25, 2002.
Investor's Business Daily, Box Keeps Monitors, Mice to a Minimum, Sep. 8, 1997.
Joseph C. McAlexander Deposition Transcript, Case No. 01-CV-4435, Apr. 27, 2005.
KVM Switch History, Aug. 2, 2002, 2 pages.
KVM Switches Roundup, Windows NT Magazine, Jul. 1997.
Lan Times, The beauty of Apex is a two-sided story, Nov. 20, 1995.
Lightwave Communications, Inc., Product Brochure, APX 304594-304605, Jun. 1, 1998.
Lu, E&J Int. 4-Port KVM Switch, Jul. 4, 2001.
Marksman Transcript, *Avocent* v. *Raritan*, Civil Action No. 4435, Feb. 3, 2005.
Marksman Transcript, *Avocent* v. *Raritan*, Civil Action No. 4435, Feb. 4, 2005.
Memorandum and Order on Marksman issues, Case No. 01-CV-4435, (Mar. 11, 2005).
Network Computing, Product Brochure, May 15, 1995, 5 pages.
Network Technologies Inc., Product Brochure, 1998, 2 pages.
Network World, advisement, Jul. 6, 1992.
Ocean Isle, Reachout Product Brochure, RCI 172996-173006, Jun. 1994.
PC World, New Products, May 1995, 2 pages.
PolyCon GmbH Data System Inc., product catalogs, APX 024328-042697, prior to Spring, 1995.
Press Release, Maintain Error-Free Central Control of 128 PCs from One Set of Keyboard, Mouse, and Monitor, Feb. 4, 1999, 1 page.
Protest Under 37 CFR 1.291 Filed in U.S. Appl. No. 08/969,723, Feb. 13, 1999.
Raritan, CompuSwitch, Mar. 16, 1998, 1 page.
Raritan, Dominion KSX, Jul. 19, 2003, RCI 139356-139371.
Raritan, Dominion KX and Dominion KSX, 2004, 181193-181211.
Raritan, MasterConsole MXU2, Jul. 31, 2001.
Raritan, MasterConsole II, User's Manual, 2000.
Raritan, Paragon UMT2161, RCI 147483-147505, Jul. 5, 2002.
Raritan, Paragon User's Guide, Jun. 15, 2000.
Raritan, Paragon II User Manual, 2004.
Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.
Rextron, Product Brochure, Aug. 1, 2002, 5 pages.
Rose Electronics, "Master Switch Installation and Operation Manual," 1991.
Rose Electronics, UltraView Installation and Operation Manual, 1991-1997.
Rose Electronics, Ultra View, Aug. 1, 2002, RCI 173332-173336.

Startech Computer Products Ltd., Product Press Release, APX 304618-304619, Feb. 1998.

Supplemental Expert Report of Bruce McNair Regarding United States Patent Nos. 5,884,096 & 6,112,264 and 5,937,176, Apr. 17, 2005.

Supplemental Expert Report of Joseph C. McAlexander Regarding Infringement of U.S. Patent Nos. 5,884,096, 5,937,176 and 6,112,264, Mar. 22, 2005.

Supplemental Expert Report of Michael H. Davis, Apr. 18, 2005.

SwitchCom, ProServer, Aug. 1, 2002, 2 pages.

Tikkler, Belkin OmniView SE 4-Port KVM Switch, Nov. 8, 2000.

Tony Dekerf and Gary D. Davis, "A Close Look At Modern Keyboard, Video & Mouse Switches," 1995.

Trial Transcript, *Apex* v. *Raritan*, Southern District of New York, Case No. 01-CV-4435, vol. 1, Jan. 2002.

Trial Transcript, *Apex* v. *Raritan*, Southern District of New York, Case No. 01-CV-4435, vol. 2, Jan. 2002.

Trial Transcript, *Apex* v. *Raritan*, Southern District of New York, Case No. 01-CV-4435, vol. 3, Jan. 2002.

Trial Transcript, *Apex* v. *Raritan*, Southern District of New York, Case No. 01-CV-4435, vol. 4, Jan. 2002.

Trial Transcript, *Apex* v. *Raritan*, Southern District of New York, Case No. 01-CV-4435, vol. 5, Jan. 2002.

Trial Transcript, *Apex* v. *Raritan*, Southern District of New York, Case No. 01-CV-4435, vol. 6, Jan. 2002.

Trial Transcript, *Apex* v. *Raritan*, Southern District of New York, Case No. 01-CV-4435, vol. 7, Jan. 2002.

Tron International, Inc., KVM Products Catalogs, 1997.

Tron International, Inc., Products Catalogs, 1996.

Tron International, Inc., Product Brochure, 1997, 4 pages.

Unisys, PW2 Advantage Series Rackmount Server, 1995.

Yee Liaw Deposition Transcript, Case No. 01-CV-4435, Mar. 3, 2005.

Yee-Shung Liaw Deposition Transcript, Case No. 01-CV-4435, Dec. 6, 2001.

The list of docket reports in the litigation: *Avocent Redmond Corp.* v. *Raritan Computer, Inc.*, Civil Action No. 1:01-CV-04435(PKC), United States District Court for the Southern District of New York.

Response to EPO action in corresponding EPO Application 08 755 222.0, Sep. 27, 2011.

EPO action dated Mar. 17, 2011.

* cited by examiner

| Port Number | Port Name | Status | Availability |
|---|---|---|---|
| 1 | Dominion-KX2_Port1 | down | idle |
| 2 | Dominion-KX2_Port2 | down | idle |
| 3 | Dominion-KX2_Port3 | down | idle |
| 4 | Dominion-KX2_Port4 | down | idle |
| 5 | JLtestPC | up | idle |
| 6 | Dominion-KX2_Port6 | down | idle |
| 7 | Dominion-KX2_Port7 | down | idle |
| 8 | Dominion-KX2_Port8 | down | idle |
| 9 | Local Port | up | busy |
| 10 | Dominion-KX2_Port10 | down | idle |
| 11 | Dominion-KX2_Port11 | down | idle |
| 12 | Dominion-KX2_Port12 | down | idle |
| 13 | Dominion-KX2_Port13 | down | idle |
| 14 | Dominion-KX2_Port14 | down | idle |
| 15 | Dominion-KX2_Port15 | down | idle |

Raritan
Dominion KX II

Port Access | Virtual Media | User Management | Device Settings | Security | Maintenance | Diagnostics Home > Port Access Port Access Click on the individual port name to see allowable operations.
0 of 4 Remote KVM channels are currently in use.

Time & Session:
February 23, 2007 17:17:37
User: admin
State: active
Your IP: Local Console
Last Login: Feb. 23, 2007 17:08

Device Information:
Device Name: DominionKX
IP Address: 192.168.59.97
Firmware: 2.0.0.2.5240
PowerIn1: on
PowerIn2: off Port States:
2 Ports up
13 Ports down
14 Ports idle
1 Ports busy Connected Users:
admin (Local Console) active
admin (192.168.59.93) RC active Logout

LOCAL PORT BROWSER INTERFACE

CROSS-REFERENCE TO RELATED APPLICATIONS

This application claims the benefit and priority of U.S. Provisional Application Ser. No. 60/917,349, filed May 11, 2007, the disclosure of which is incorporated herein by reference.

FIELD OF THE INVENTION

The invention relates generally to management of remote devices such as servers and in particular to the management of keyboard, video and mouse (KVM) switches that provide a web browser interface capability at a local port of the KVM switch.

BACKGROUND OF THE INVENTION

In general, KVM switches consist of two types of ports. CPU ports (interfaces to the servers to be controlled) and a local port. The local port allows communication links for keyboard, mouse and video data to be aggregated and controlled by local terminal devices having keyboard and mouse control devices and a video display. Local terminal devices are typically connected directly to the KVM switch and are intended to be used by administrative personnel to control the KVM switch, such as to switch to different CPU ports or to setup certain parameters such as security information. This is referred to as a "local user mode."

The CPU ports provide access to the KVM switch and allow users to access networked workstations running WEB browsers with BIOS-level, and up, remote access, and control of up to 64 servers located anywhere in the world. This mode of operation is referred to as the "IP mode" or "remote user mode."

Because local and remote users are accessing the KVM switch through different ports, an issue arises between the display seen by a user. More specifically, a remote user and a local user will experience different views when accessing the KVM data.

In inexpensive KVM switches with very limited functionality, local ports are typically accessed by users using special keystrokes or specific mouse movements but relay no visual feedback from the switch to the local user. Other systems such as those described in U.S. Pat. No. 5,721,842 issued to Beasley, use on-screen display technology ("OSD") to provide information to a local user. Current OSD technology uses clunky fonts and does not have graphical pixel based capabilities that dramatically limit presentation capabilities. Reliance on the OSD technology is further constrained when the KVM switch provides remote network based access, i.e., KVM over IP to remote users and OSD access to local users.

Further, in addition to the difficulty of having to manage, learn or maintain multiple different systems, OSD technology is highly proprietary. Every piece of data or information has to be encoded using proprietary techniques. This doubles the effort for every change and every localization that needs to be done during the product life cycle because changes have to be adopted for the OSD view and for the web-based view. Further, the different user experiences and interface also leads to doubling the training and support efforts.

It is desirable to provide a KVM switch that utilizes the same display interface for both local and remote users. It is further desirable to provide KVM users with a KVM interface that utilizes similar instruction and control sets in both the remote and local modes.

BRIEF SUMMARY OF THE INVENTION

A KVM switch according to the principles of the invention implements an embedded web browser to ensure that a local port user has access to a web-based view similar to that experienced by remote users. This innovation can be applied to KVM switches that are controlled by a user at a local console. It provides a better local user experience because of the "web like" interface. It further provides a single source for product localization. For example, product changes result in reduced development effort and faster time to market. A user who utilizes both the local console and the remote access (KVM over IP) will get the same or at least similar resultant view. This further reduces field support and training efforts.

DETAILED DESCRIPTION OF THE DRAWINGS

An exemplary embodiment of a KVM switch according to the principles of the invention uses a HTML based local interface by placing an embedded web browser at the same control processor as the hardware that controls the KVM switch. The KVM switch may function and act as a server for remote KVM over IP type access to the targets from a user. The innovative technique combines three functions on in one switch.

There are essentially two levels of control interface access. The first level of access is KVM over IP interface and has full access to all features. Full KVM over IP access includes the control interface as well as the redirection of the keyboard, mouse and video interface over a suitable network. The second level of access is to the administrative features of the switch itself, including for e.g., setup functions such as color depth, user data, IP network setup and other such functions.

In another exemplary embodiment, if the three functions are placed in different switches, then only the control functions or administrative features of the KVM switch are available to the user.

An exemplary switch, which can be an analog KVM switch or a KVM over IP enabled KVM switch, has a control processor. If the switch is a KVM over IP enabled switch, the control processor will have sufficient computer power to compute network protocols such as TCP/IP and encode and encrypt the KVM data over the network channel using standard techniques.

Figure 1:
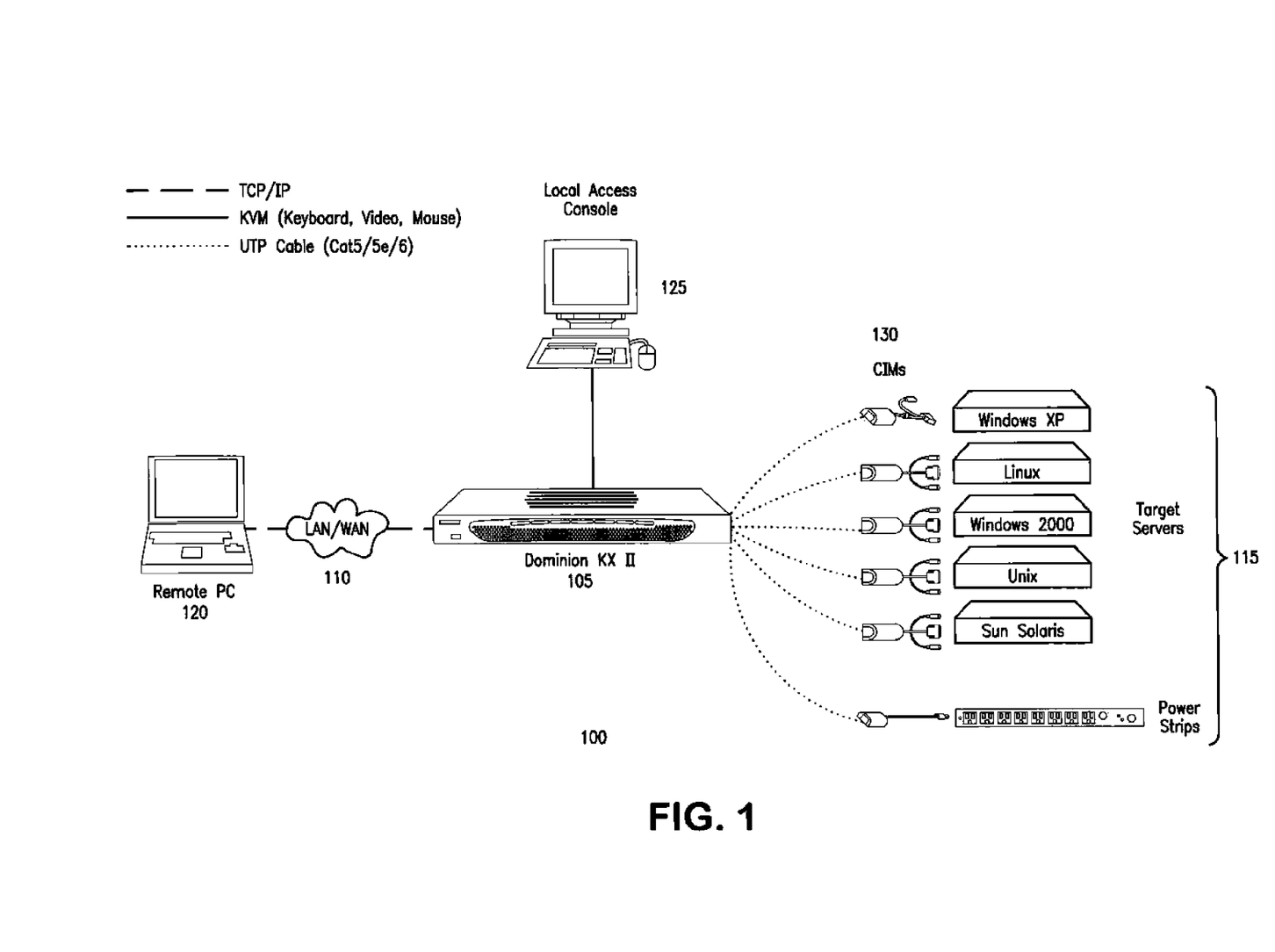
FIG. 1 is an exemplary system using an exemplary switch in accordance with the invention.

Referring to FIG. 1, there is shown an exemplary remote management and access system 100 using an exemplary inventive switch 105. The system 100 comprises a plurality of remote devices or targets 115 that can be accessed by a plurality of users, including remote users 120 and local users 125. Remote users 120 connect through network 110 while local user 125 connects directly to switch 105. The remote devices or targets 115 can be any of a number of devices including servers, computers, power strips and other constructs and are connected to switch 105 through computer interface modules ("CIMs") 130. The connections can be made using any of a number of standard techniques including but not limited to wired, wireless, Ethernet, cable, and communications media.

Figure 2:
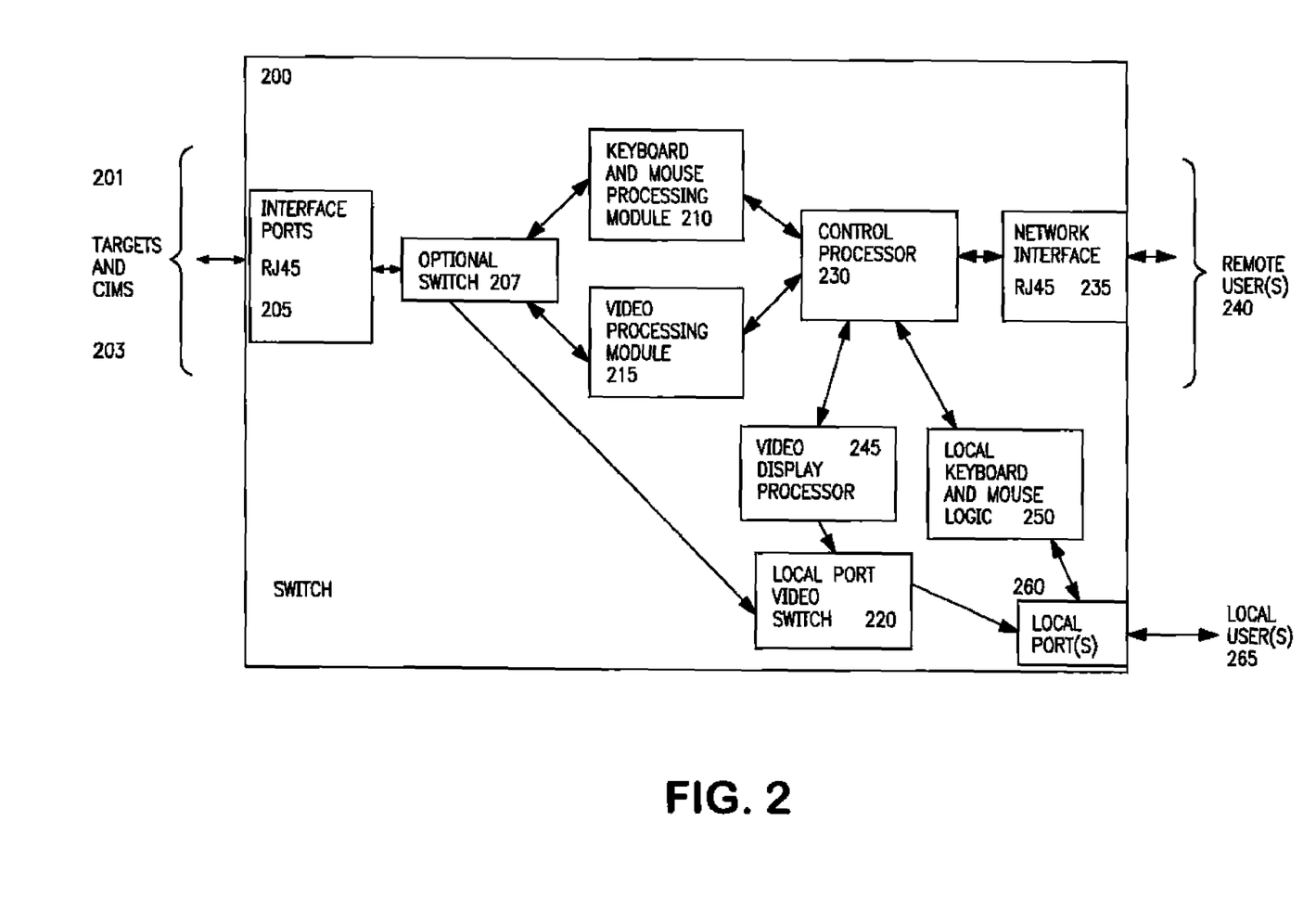
FIG. 2 is an exemplary top level block diagram of a switch in accordance with the invention.

Referring to FIG. 2, there is shown a block diagram of switch 200 in accordance with one embodiment according to the principles of the present invention. This structure supports multiple embodiments of the local port browser interface. The switch 200 is comprised of interface ports 205 that are connected to targets 201 via CIM 203. Interface ports 205 can be a RJ45 connector or any other suitable connector. The interface ports 205 are coupled to a keyboard and mouse processing module 210, a video processing module 215 and a local port video switch 220. In an exemplary embodiment, an optional switch 207 is situated between interface port 205 and video processing module 215. Optional switch 207 may also provide an input to local port video switch 220. Optional switch 207 can be, for example, an analog KVM switch that couples a larger number of inputs into a set number of video and keyboard and mouse processing instances. For example, this arrangement allows for a greater number of targets and associated CIMs to be serviced by switch 200 and increases cost efficiencies.

Modules 210 and 215 are further coupled to a control processor 230, which in turn is coupled to a network interface module 235. Control processor 230 can be, for example, an IBM® Power PC 405 or a XGI® Z7 chip. Network interface module 235 is further connected to remote users 240. Control processor 230 is further coupled to a video display processor 245 and local keyboard and mouse logic 250, which in turn are coupled to local port 260. Video display processor 245 can be any standard video graphics card or VGA chip. The interconnection can be implemented using any suitable hardware interface such as for example, PCI or PCI express interfaces. Video display processor 245 is an input to local port video switch 220, which in turn is coupled to local port 260. Local port 260 outputs data to local users 265.

Figure 3:
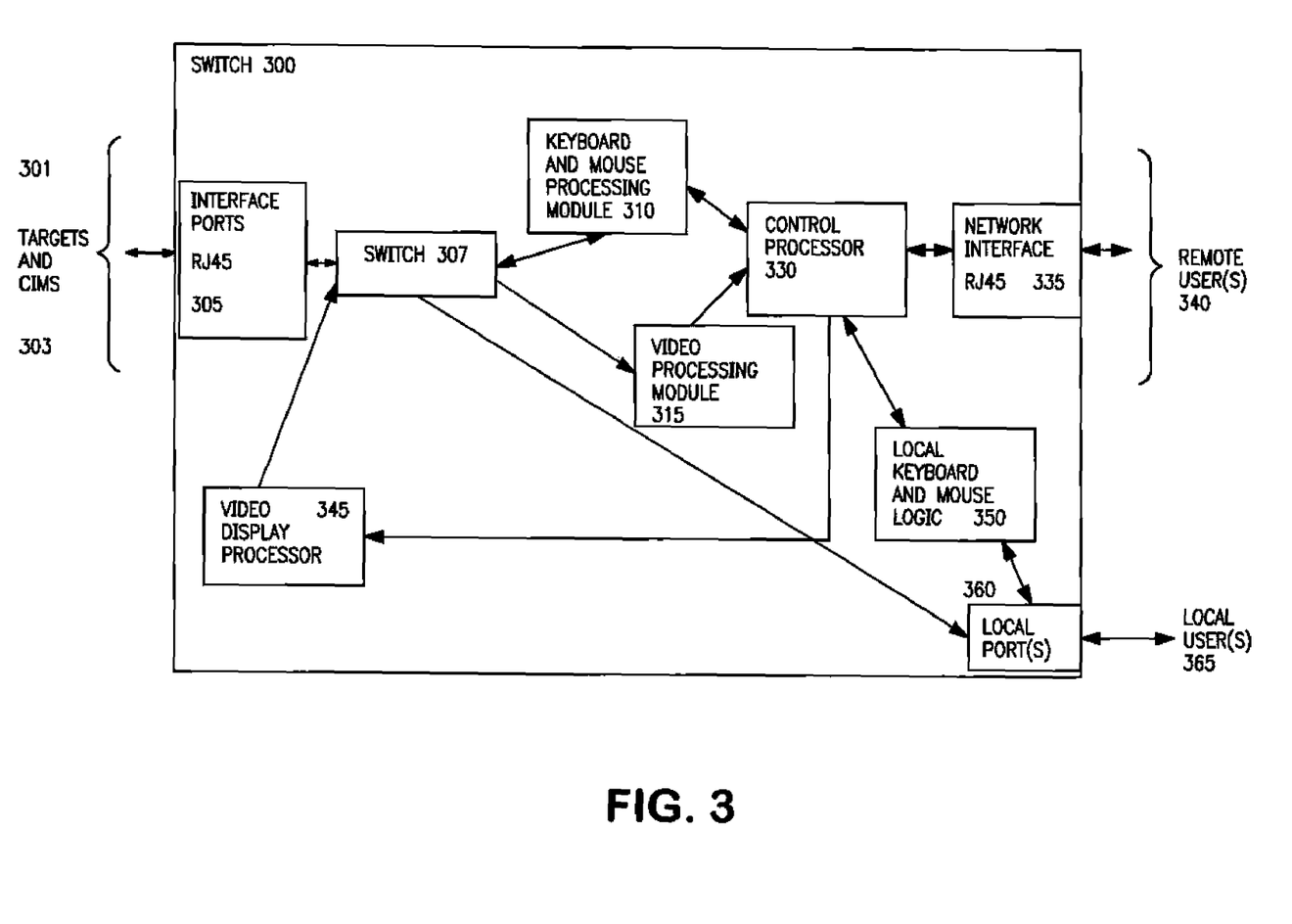
FIG. 3 is another exemplary top level block diagram of a switch in accordance with the invention.

Referring to FIG. 3, there is shown an exemplary switch 300 that supports multiple embodiments of the local port browser interface. Switch 300 is comprised of interface ports 305 that are connected to targets 301 via CIMs 303. Interface ports 305 are coupled to a switch 307 that can be, for example, an analog KVM switch that couples a larger number of inputs into a set number of video and keyboard and mouse processing instances. Switch 307 is in turn coupled to a keyboard and mouse processing module 310, a video processing module 315, a video display processor 345 and a local port 360.

Modules 310 and 315 are further coupled to a control processor 330, which in turn is coupled to a network interface module 335. Network interface module 335 is further connected to remote users 340. Control processor 330 is further coupled to a video display processor 345 and to a local keyboard and mouse logic 350, the later of which is coupled to local port 360. The interconnections can be implemented using any suitable hardware interface such as for example, PCI or PCI express interfaces, or any other standard interconnect techniques. As stated above, video display processor 345 is an input to switch 307, which in turn is coupled to local port 360. Local port 360 outputs data to local users 365.

Referring now to FIGS. 1 and 3, in general, a remote user 120 in a remote management system 100 requests keyboard, video and mouse data from target 115. The keyboard and mouse data are sent from the targets 115 and CIMs 130 via interface port 305 to modules 310 and 315. Modules 310 and 315 process the data for transmission to remote user 340 via control processor 330 and network interface 335. With respect to the video signals in the remote user mode, the video signals are digitized prior to transmission.

Specifically, as described above, interface port 305 is connected to CIM 303 which is further connected to target server 301. Network interface 335 is connected to network 110 consisting of any number of routable objects that networks devices together. Network 110 is also connected to a remote user computer 120 or 340, which is running a web browser application (not shown). Remote user computer 340 directs the web browser to connect to switch 300. The web browser communicates with switch 300 over network 110, and its request is routed through network interface 335 to control processor 330, where it is handled by a web server application running on control processor 330. The web server application running on control processor 330 delivers a web page back to the web browser running on remote user's computer 340 asking for login credentials. The user at remote user computer 340 enters the login and password into the web page, and the information is sent back to control processor 330, which validates the credentials, and if they are acceptable, creates a web page that lists the target systems 301 that the user has the right to access. This web page is sent back to the web browser application running on remote user computer 340 and displayed to the user. The user selects a particular target system 301 to interact with. This request is sent back to the web server application running on control processor 330.

While the web server application running on control processor 330 is processing the request, the web browser application running on remote user computer 340 launches a client viewer application (not shown) on remote user computer 340. As the web browser itself is not capable of handling KVM data or information, this viewer application must take over the interaction.

The web server application running on control processor 330 passes the request to the main control program in 330. The main control program instructs switch 307 to connect the appropriate port 305 into the appropriate video processing module 315 and keyboard and mouse module 310. Video data coming from target server 301 is passed into CIM 303 and is reformatted into a proprietary video format (still analog). The video passes from target server 301 through CIM 303, and then through switch 307 and into video processing module 315. Video processing module 315 captures the analog video and converts it to a digital format. As high speed, high resolution video requires a very large amount of data to capture, video processing module 315 performs some compression on the incoming data before relaying it to control processor 330.

At control processor 330, further compression may be applied to the video (depending on how much bandwidth is available to send the image to the client). After compression, encryption is also applied to ensure the video cannot be viewed by a listening device on network 110. The data is then sent out over interface 335 into network 110. The data is received at remote user computer 340. This is streamed into the viewer application running on remote computer user 340 which decrypts and decompresses the video, and displays it on the screen.

When the user moves the mouse or performs keystrokes, the viewer application running on remote computer user 340 captures this activity and sends it out over network 110 to switch 300. Specifically, the mouse and keystroke signals are received by interface 335 and passed to control processor 330. Control processor 330 will perform any necessary reformatting and send the signals/events to keyboard and mouse module 310, which will convert it into hardware level signals to be sent out to CIM 303 via switch 307 and interface port 305. At CIM 303, these signals are converted into the format needed to be sent to target server 301 keyboard and mouse interface, and passed into target server 100.

A local user can access keyboard, video and mouse data having the same touch and feel as a remote user as described above. In local user mode, control processor 230 and video display processor 245 work together to run a web browser and generate a web page at the local port 260. As seen in FIG. 2 a local user is sent the requested data via local port 260, which in turn receives keyboard and mouse data from local keyboard and mouse logic 250 and video from local port video switch 220. Local port video switch 220 receives video from video display processor 245 or optional switch 207. Video data received from video display processor 245 is in a digital format and video received via optional switch 207 is in an analog format. Local user can also send keyboard and mouse data to target server 201 using the reverse path. Specifically, the data is sent from local port 260 to local keyboard and mouse logic 250 which in turn feeds it to control processor 230. Control processor 230 sends the data to interface port 205 via module 210 and switch 207. Port 205 sends the data to CIM 203, which in turn sends it to target server 201.

Figure 5:
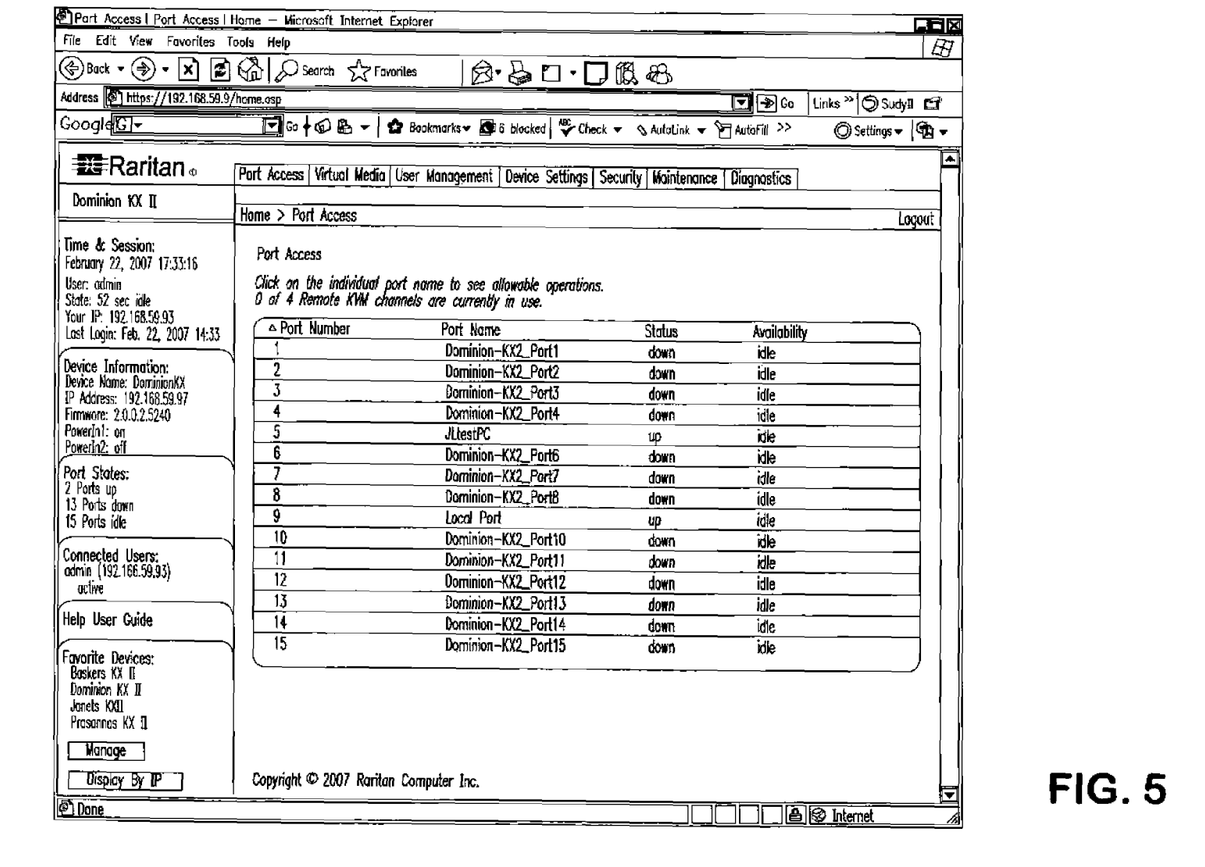
FIG. 5 is an exemplary view of the local port WEB browser interface in accordance with one aspect of the present invention.
Figure 6:
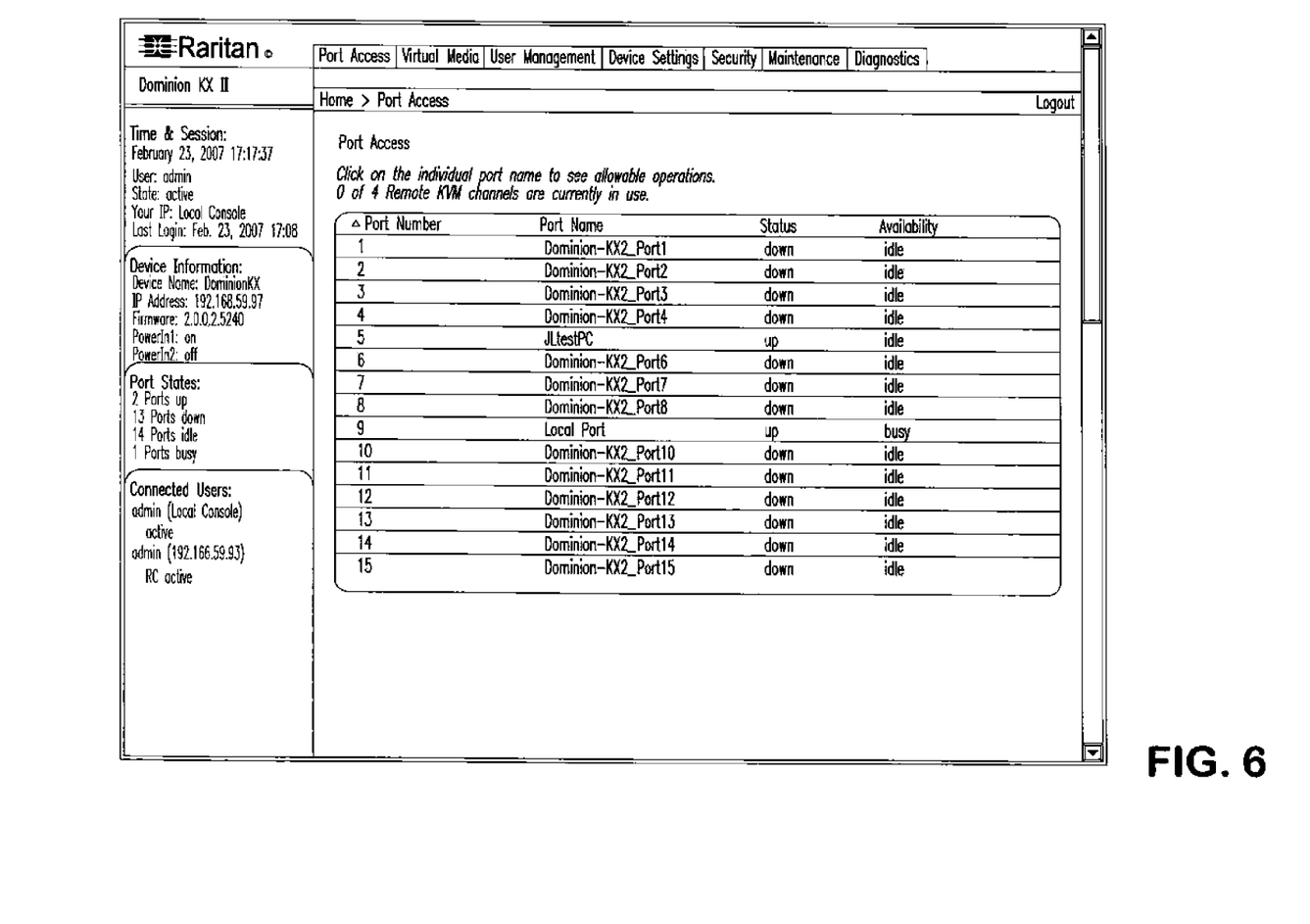
FIG. 6 is an exemplary view of the Remote console main page browser interface in accordance with one aspect of the present invention.

By modifying the existing technology one aspect of the present invention is able to create a user interface that would be familiar to a user regardless of how a user accesses the system, e.g., over a network or via the local port. As seen in FIGS. 5 and 6, a user accessing the KVM switch through the local port will experience WEB page 600, which is similar in look and feel to the display 500 encountered by a user accessing the system over a network. Because having more than one user interface leads to confusion and often forces users to get additional training, at additional cost to the user, and because the local interface may only be used on rare occasions in some environments, it is advantageous to provide a local port interface with the same look and feel of the WEB browser interface. The exemplary embodiment of the present invention overcomes these problems and allows users to seamlessly transition between remote access over an IP network and local access.

In order to implement the web browser based local console of the present invention a video display processor is interfaced with a control processor. A web browser software module executes on the control processor 230 or other hardware to provide a web based display at a local port 260. Specifically, control processor 230 executes a web browser application so that the video display processor 245 can generate a web page that allows administrative, management and switching functions in response to a local user request. The web browser is the only graphical application running on the control processor 230 that uses the video output channel. It runs as a separate process in the operating system running on the control processor 230. By default it will always connect back to its own machine e.g., (http://localhost) to show the web page that resides in the memory of the control processor 230. The web browser is customized to that connection so that the URL itself is not shown.

Both a web browser and a web server run on control processor 230. The web server provides the standard KVM over IP functions, and such implementation is well known in the art. Implementation of embedded web browsers are not well known in the art, and embedded web browsers are not widely used in this type of application. Prior implementations of KVM over IP have failed to take full advantage of embedded browsers because they typically are not fully functioning web browsers supporting the latest Web standards. Typically existing embedded browsers are used in mobile applications such as mobile phones and PDAs.

In these types of applications, the mobile web browser has a reduced function set, because the screen size of the mobile device does not allow a typical web usage pattern. In the remote management application and in particular the local port application of the KVM switch of the present invention however, a full size screen, e.g., the local console, is typically available. Further, a full size keyboard and a standard mouse are also available. Standard web based usage patterns of the user are therefore also available. To overcome the short falls of the reduced functionality of the mobile type web browser, reduced graphics tools and memory management techniques to take advantage of the available embedded browsers, such as "osbbrowser" from Apple computer.

To create the experience at the local port similar to that of a remote user, one aspect of the present invention is to recreate the environment that a modern PC provides, including a full-functional web browser on the KVM platform. A typical KVM switch however, has more limited processing power than a PC. Specifically, the processing power of a typical KVM switch is approximately one-tenth that of a modern system, with one-sixteenth the amount of RAM and one-fortieth the storage capacity, and limited graphics capabilities. The limited resources in the KVM system, in addition to providing the browser interface, also needs to perform all the functions of the typical digital KVM switch. Accordingly, the resources available to run the embedded web browser are much more limited than what is commonly available in today's designed WEB browsers.

The limited embedded browsers typically used in smaller mobile devices, generally have significant limitations such as limited support for more complex web behaviors like scripting and applets, and are often designed for smaller screen sizes.

Accordingly, the existing embedded technology needs is adapted and modified to achieve acceptable performance within the limited resource environment of a KVM switch. Additionally, the web server is customized to maximize the content of the web pages and to maximize the ability to display them in this environment, while still performing at minimum performance requirements as well as looking clean and modern on a standard (remote) web browser.

To utilize an embedded browser running on control processor 230, in this embodiment, the "osbbrowser" from Apple Computers may be utilized. The osbbrowser is a browser originally adapted for Apple WebKit. Because the osbbrowser is designed for a mobile phone/PDA environment it suffered from the shortfalls identified above. Accordingly, in order to allow it to perform satisfactorily on control processor 230 and to provide sufficient graphics capabilities for the local port, modifications need to be made in both memory capabilities and graphics capabilities.

The osbbrower, as is typical of embedded browsers available, does not contain sufficient graphics capabilities to provide sufficient graphics at the local port. To overcome these shortfalls, the osbbrowser requires a Graphical Tool Kit, "GTK", typically utilized in a more resource rich environment such as a desktop computer environment. However, the smaller memory available to the osbbrower cannot adequately handle the memory footprint of a full blown GTK. To overcome this, unnecessary modules are removed from the GTK, leaving only the essential elements to run the local port graphics. Further, the underlying Xwindows environment needs to have libraries, such as composite (3D graphics) of Xwindows, Nesting of X windows, etc. removed. Such unnecessary modules include for example, modules related to Dynamic GTK plugins, TIFF libraries, Shadow frame buffer libraries, etc. Once the GTK is reduced to its necessary modules, it is important to optimize the memory mapping of the GTK onto the osbbrowser to ensure adequate performance.

The unmodified osbbrowser may contain "memory leaks" i.e., where the browser never frees up memory once it is no longer being utilized, depending on the state of the embedded browser utilized, thereby consuming memory until the system crashes. As will be appreciated by those skilled in the art, the memory resources of the osbbrowser may be analyzed using known techniques, to determine which portions of memory contained necessary memory threads that can not be disturbed, and which memory resources are not being utilized and can be reutilized by the system.

Further, modifications to the embedded browser running on control processor 230 also include for example, modifications addressing display screen resolution and "xwindow" type applications. Typically, the osbbrowser should be able to process the commands to change and dynamically update the screen size and resolution to match the preferences set by the user. A reset/restart of the osbbrowser running on control processor 230, is sufficient for the osbbrowser to implement the previously selected screen resolution. Such a restart of the osbbrowser appears seamless to the user at the local port and does not interfere with operation of the local port.

Further, because the graphical experience of the user at the local port must closely track the graphical experience of the user of the remote port, other graphical features running on the embedded browser of control processor 230 such as screen scroll, popup menus, and popup dialogs are made available to the osbbrowser. In order to implement these features, additional drawing graphics features, of the GTK need to be updated to correspond with those same features and functionality available to the remote user.

Further, in another exemplary embodiment, the embedded osbbrowser of control processor 230 incorporates xterm functionality. Xterm, as is known in the art, is the standard terminal emulator for the XWindow System, Xterm allows a user to have many different invocations of xterm running at once on the same display, each of which provides independent input/output for the process running in it. However, as with the other graphical applications, the xterm libraries needed to be minimized by reducing and stripping out modules such as VT termcap configuration files that contain limited terminal emulator configurations used by XTerm as well as popup menu modules that provide a lot more functionality in a full blown Xterm interface.

As will be appreciated by those skilled in the art, modifications to the local port control display of the KVM switch allows the user to experience similar web page views when accessing the remote access console of the same KVM switch. Specifically, the local port and its associated display has access to "n" KVM channels or control interfaces and also the n+1 channel for accessing the graphical control interface of the switch as provided by the web browser. As explained below, access to the KVM control interface is accomplished by switching the internal switch to the corresponding control processor port.

With respect to FIG. 2, a local port video switch 220 is used so that the video output to local port 260 can be switched via a separate device and not as a part of the main switching matrix 207 since a remote user does not need to see or access this channel. If a local user makes a request, the control processor 230 executes a web browser to permit administrative and switching functions. If the local user selects a digital channel such as in the case when a user utilizes a digital local port where the input video is digitized and passed to the video display processor, as disclosed herein, local port video switch 220 routes the video from video display processor 245 to local port 260. If an analog channel is selected, switch 220 switches to route analog video from targets 201 via switch 207 to local port 260. If a user access a remote channel, such as a channel on a different switch, the video must be streamed digitally over the network to the control processor and the video display processor to show the video, then the video must be created digitally by 245, and accordingly, 220 will not switch.

As seen in FIG. 3 the video output of video display processor 345, e.g., red, blue, green, horizontal and vertical synchronization signals, as well as a mouse/keyboard interface of the control CPU (usually PS/2 based but not limited to) is connected to the keyboard video mouse switching matrix 307 in the same way as any other KVM channel coming from the outside. This interface creates a n+1 channel of a n channel KVM switch. For example, both analog and digital video are routed through switch 307 to local port 360.

The local port video output can be accessed by simply switching to the n+1 channel using the same switching usage as for the other channels (usually hotkeys). In the case that the switching between different KVM channels is done over the local console, one special hotkey may be assigned to implement access to the local port. This can be done in the controller chip which controls the incoming signals from the local console keyboard and mouse. Access can be achieved using a keyboard combination to switch to the n+1 channel, special mouse movements such as for example, call gestures, or other input device features.

As long as the web browser running on the main control processor 230, as opposed to running on some other system outside the switch, is accessing the local web server using standard login authentication and authorization—which is the standard mode of operations—no additional local authentication needs to be done. Typically local consoles have a fairly simple form of authentication. The shared use of the same set of web pages implements network level security at no additional cost, if required. If network level security is not desired, then the local console can check if the web browser request comes from the same control processor. The local console can then disable the security verification.

In another exemplary embodiment, a local user can receive a digital version of the target video using the very same KVM viewer technology from the remote side to view the local port. In the digital local access port embodiment, instead of providing target access via analog video, as is described in the HTML local access port embodiment above, access is created by digitizing the incoming target video and then displaying it using the standard graphics processor. This implementation will use one of the KVM over IP converters in the switch.

In the digital local port application, the signals from the targets are routed to the digitizing circuitry 245, or 345 similar to how remote access is handled. Instead of compressing the data via video processor 215 and sending it over the network 110, the digitizing circuitry feeds it directly in the local video processor memory for immediate display on the screen. This may be done by some direct link between the digitizer and the video memory, through a memory access technology such as direct memory access ("DMA"), or even handled by the main processor as a software action.

Specifically, target keyboard and mouse data from targets 201 and 203 is routed to module 210 to packetize the keyboard and mouse data and the video received from target 201 via CIM 203 is routed to module 215 to digitize the video data. The processed data is then sent to control processor 230, which in turn sends it to video display processor 245 and local keyboard and mouse logic 250. Local user 265 receives the processed target data via local port 260.

In another exemplary embodiment, the local user can access ports on the instant switch or device as well as any other switch or device that has network connectivity. In one exemplary embodiment, access is implemented using the Digital Local Access Port embodiment discussed above. Access also can be accomplished multiple ways, including a model similar to traditional remote access and a specialized hardware model that supports hardware decoding in addition to the encoding Because the web browser can be a fully functional web browser capable of displaying any web page in the network, the Digital Local Access Port embodiment can be used to display other "local consoles" of KVM switches so long as they are connected to the same network, similar to the way a traditional remote access works. This implementation allows users of KVM switches to access different local consoles from one single physical user console. To do this simply requires the system to redirect the web browser to the appropriate URL of the KVM switch that has the targets desired. To implement this feature, certain security functions (authentication against a different KVM switch) must be implemented to ensure seamless user experience.

An alternate way to address this problem uses specialized hardware similar to the systems described above. Instead of the digital data being sent directly to the video chip of the other system, it is streamed over the network to the switch that is performing the local port access. When it is received by the switch, it is passed into the video chip and then the image will be displayed. Keyboard and mouse can be handled separately over the network as well.

In another embodiment of the present invention, multiple simultaneous implementations of the multiple device local access embodiment are supported. This can be accomplished by utilizing redundant hardware support, or using the "traditional" remote access model and some client software running at the local port, that is similar to the remote client or highly optimized for the local environment. Using the traditional remote access model, the local port behaves similar to a remote client. As described above with respect to the HTML local port, the local port is already behaving similar to a remote client "inside the box" although it is running on the device hardware. With enough processing power, the local client used for management can run an access client similar to the one on the remote. This could be a ported remote client or a completely separate application that is optimized for this embedded environment. Keyboard, mouse, and other connected devices can be handled utilizing the same methods currently performed in the remote client.

Multiple port local access is the ability to see more than one port at a time on the local access port. To accomplish this requires the use of a Digital Local Access Port as discussed above.

Figure 4:
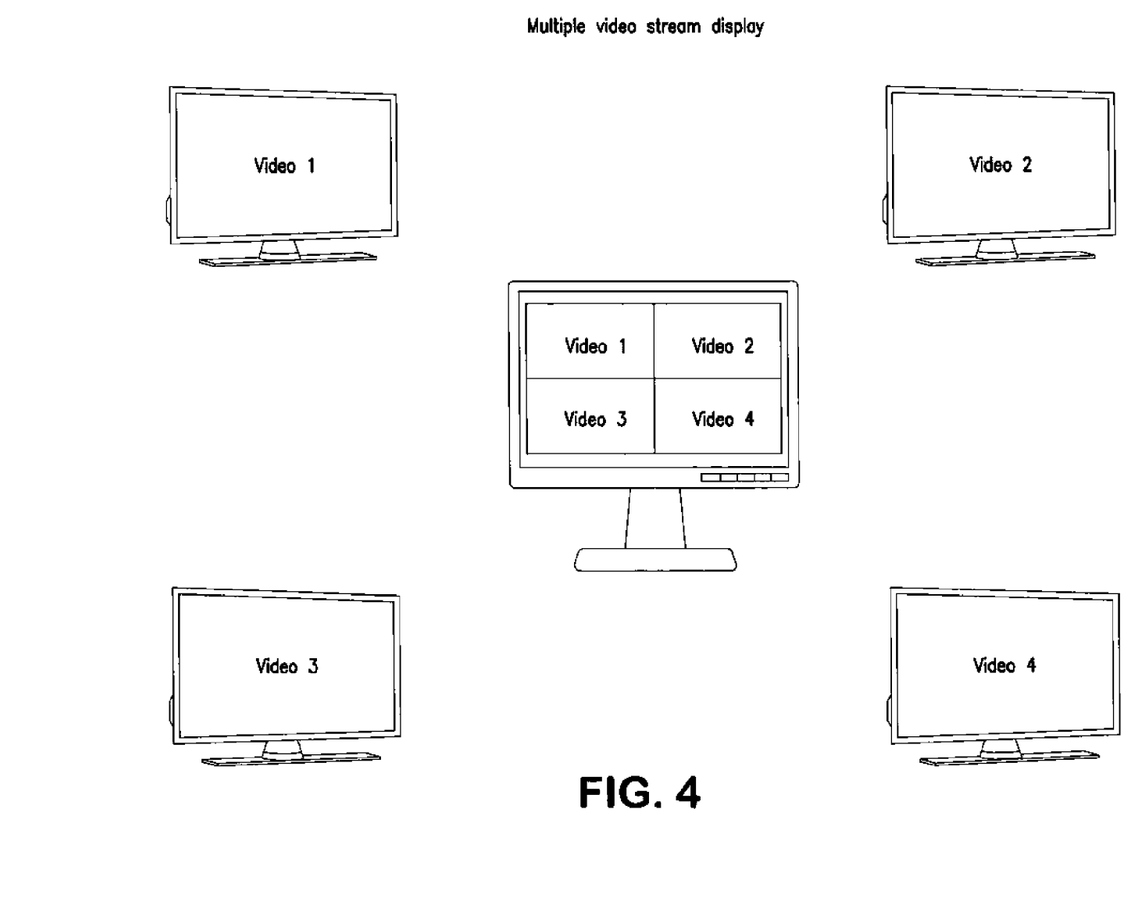
FIG. 4 is an exemplary view of multiple target data at an exemplary local user in accordance with the invention.

Multiple port local access is performed by digitizing data from different ports on the same device simultaneously. Once the video is in digital format, it can be manipulated prior to display. One exemplary manipulation is the modification of the size of the output to combine it with other output streams so that a user can monitor multiple systems at the same time on a single local monitor as illustrated in FIG. 4. Alternately, additional monitors can be supported at the local port and combined with this feature to provide larger views of multiple systems or views of more systems.

These select views could be live video or periodic snapshots of the various video streams. For live video, every video stream needs to have a dedicated video digitizing circuit. The video streams are then all combined within the main processor to form a composite stream that merges all the input streams. The composite video is then sent to the local port video processor. In a snapshot mode, only one digitizer is needed. The input of the digitizer is multiplexed to each stream in turn and captures a single frame. This frame is delivered to the main processor. Then the digitizer is switched to another stream. The digitizer will cycle through all the streams continuously. The frames from all selected streams are formed into a composite image, similar to the way the live streams are joined together in the previous embodiment. As each new frame comes in to the main processor, the main processor updates the previous frame for that stream while keeping all the other frames the same. In such a manner, there will be a continuous updating of all video streams, but images will not be displayed in real time. A scanning functionality may also be built into this implementation to allow for automatic switching of the multiple display windows to different input streams in some logical order. The user can set up a list of systems to monitor, and the system will show either a live feed or a snapshot of some of those systems using the methods above. Periodically, the system will automatically cycle to show different input streams. This output would be similar to a security camera system.

Keyboard, mouse, and other types of connected devices such as USB devices could be switched to the appropriate input streams as needed, or they could be emulated by the system as is already commonly done. Different, well-known, approaches can be taken to control how keyboard, mouse, and other devices are assigned to target systems.

If multiple device local access is combined with this embodiment, it is possible to simultaneously monitor systems connected to different devices thereby allowing for a very flexible monitoring capability at the local access port.

While the foregoing description and drawings represent the preferred embodiments of the present invention, it will be understood that various changes and modifications may be made without departing from the spirit and scope of the present invention.

What is claimed is:

1. A keyboard, video and mouse (KVM) switch system, comprising:
   a plurality of target interface ports, each of said target interface ports coupling said KVM switch system to a respective target device;
   a network interface module coupling said KVM switch system to a plurality of remote user client systems via a communications network, said remote user client systems each running a web browser application;
   a local port coupling said KVM switch system to a video display device, keyboard and mouse local console, and
   a control processor running a web server application for interaction with said web browser applications running on said remote user client systems, wherein:
      said control processor further includes a web browser application, said web browser application interacting with said web server application to generate a web page; and
      a video display processor for receiving said web page from said control processor and processing said web page into a video signal, and sending said video signal to said video display device of said local console.

2. The KVM switch system of claim 1, wherein said web page provided to said video display device of said local console provides a local user with functionality and administrative access to a target device.

3. The KVM switch system of claim 1, wherein a target device comprises a remote server.

4. The KVM switch system of claim 1, wherein a remote user client system comprises a workstation.

5. The KVM switch system of claim 1, further comprising a local port video switch coupled between said local port and said video display processor, said local port video switch also being coupled to at least one target interface port for supplying a video signal to said local port from a target device.

6. The KVM switch system of claim 5, further comprising an analog switch between said local port video switch and said at least one target interface port, wherein said analog switch is coupled to at least a second target interface port for routing video signals from target devices directly to said local port.

7. A method for accessing a first keyboard, video and mouse (KVM) switch system having a plurality of target interface ports, each of said target interface ports coupling said KVM switch system to a respective target device, a network interface module coupling said KVM switch system to a plurality of remote user client systems via a communications network, said remote user client systems each running a web browser application, a local port coupling said KVM switch system to a video display device, keyboard and mouse local console, and a control processor running a web server application for interaction with said web browser applications running on said remote user client systems, comprising the steps of:
running a web browser application on said control processor, said web browser application interacting with said web server application to generate a web page; and
receiving said web page from a video display processor of said KVM switch system, processing said web page into a video signal, and sending said video signal to said video display device of said local console.

8. The method of claim 7, further comprising the steps of:
connecting a second KVM switch system to said communications network; and
redirecting said web browser application of said first KVM switch system to a desired URL of said second KVM switch system;
whereby a local user of said first KVM switch system is provided with access to a local console of said second KVM switch system.

9. The method of claim 8, wherein local port data from said second KVM switch system is streamed over the communications network to said first KVM switch system.

* * * * *